United States Patent [19]
Wang

[11] Patent Number: 5,898,469
[45] Date of Patent: Apr. 27, 1999

[54] MONO-LENS EYEGLASSES

[75] Inventor: Shr-Ren Wang, Tainan Hsien, Taiwan

[73] Assignee: Chiang Heng Trading Co., Ltd., Tainan Hsien, Taiwan

[21] Appl. No.: 09/081,217

[22] Filed: May 20, 1998

[51] Int. Cl.[6] .................................................. G02C 1/00
[52] U.S. Cl. .............................. 351/86; 351/83; 351/103; 351/106
[58] Field of Search .................................. 351/83, 85, 86, 351/103, 105, 106, 88, 89, 104, 107, 108, 109, 110, 111, 121, 140, 153, 41

[56] References Cited

U.S. PATENT DOCUMENTS

| | | | |
|---|---|---|---|
| 4,998,815 | 3/1991 | Lin | 351/106 |
| 5,387,949 | 2/1995 | Tackles | 351/121 |
| 5,592,242 | 1/1997 | Ooie | 351/44 |
| 5,661,535 | 8/1997 | Wang | 351/120 |

*Primary Examiner*—Hung Xuan Dang
*Attorney, Agent, or Firm*—Rosenberg, Klein & Bilker

[57] ABSTRACT

A mono-lens eyeglasses includes a frame, a mono-lens and two temples. The frame has a center opening respectively in two ends, and a long groove in a lower edge for an upper edge of the mono-lens to fit in. The mono-lens has a notch formed respectively in two ends for a front end of each temple to engage in or disengage from by swinging the temple. Then the mono-lens may by removed from the frame and replaced with a new one by swinging the temple with the front end disengaged from the notch of the mono-lens without need of any tools.

2 Claims, 4 Drawing Sheets

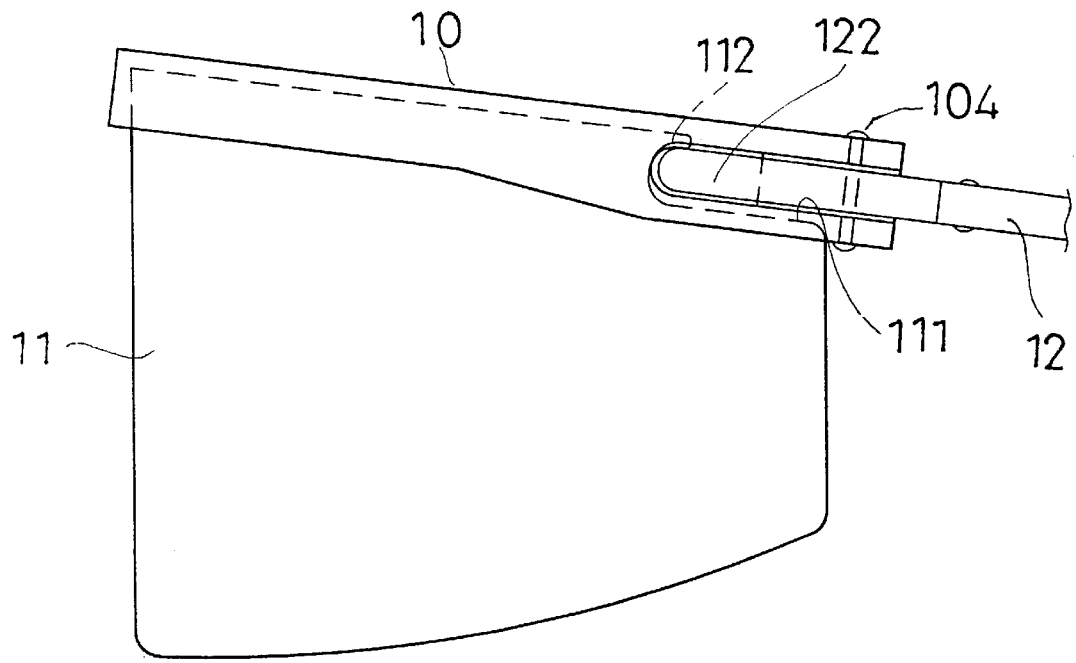
F I G. 2
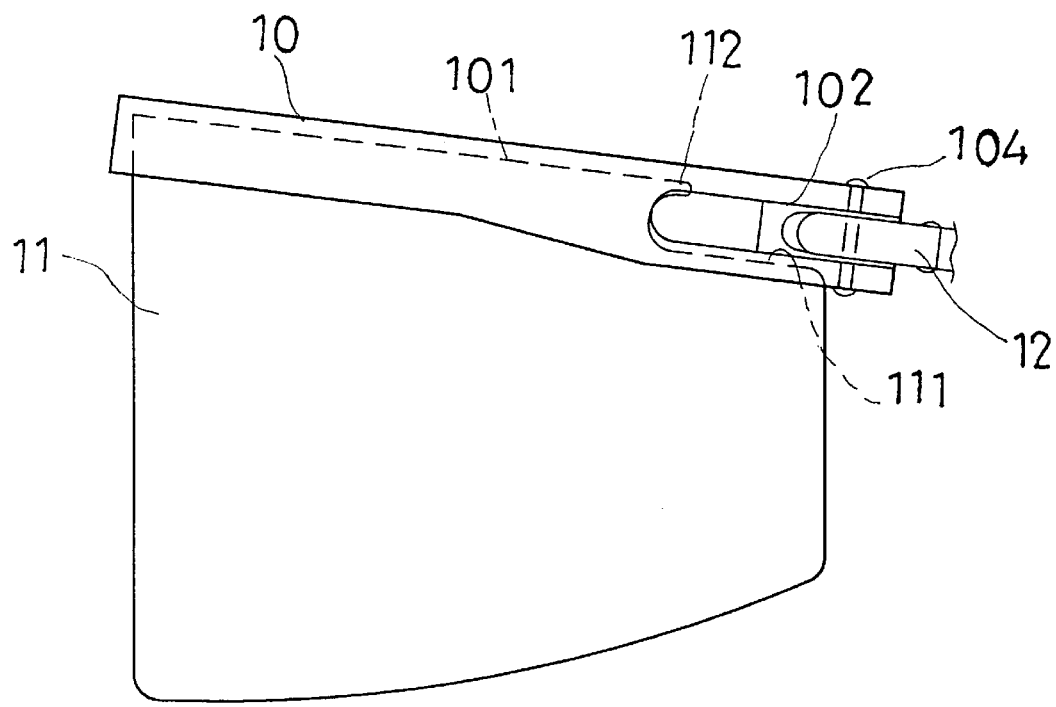
F I G. 3

MONO-LENS EYEGLASSES

BACKGROUND OF THE INVENTION

This invention relates to mono-lens eyeglasses, particularly to one having its mono-lens alterable easily for various needs of users with no tools used.

First known conventional mono-lens eyeglasses shown in FIG. 4 includes a frame 90, a mono-lens 95, two temples 97 combined together. The frame 90 is provided with a long groove 91 formed in a lower edge for an upper edge of the mono-lens 95 to fit therein, and a recess 92 respectively formed in a rear side of two ends and a hole 93 bored in each recess 92. The mono-lens 95 gas a hole 96 corresponding to the hole 93 of the frame 90. Each temple 97 has a front end provided with a hole 98 corresponding to the hole 93 of the frame 3, and its front end fits in each recess 92 and is secured with the frame 90 with screw 94.

The first conventional mono-lens eyeglasses are especially used in sports activities, and various kinds of lenses are needed for various kinds of sports. So users change lenses by replacing processes, wherein tools such as drivers are required for removing screws. But where are drivers ? They cannot be carried with by sportsmen engaging in sports.

Next, second known conventional mono-lens eyeglasses shown in FIG. 5 has a more simple structure, including a frame 90 provided with a long groove 91 in a lower edge for an upper edge of a mono-lens 95 to fit therein, and two temples 97 combined with two ends of the frame 90. In use of the second conventional mono-lens eyeglasses if the mono-lens are frequently changed, tightness of the mono-lens against the groove may gradually deteriorated to result in the mono-lens falling off the groove easily in sport activities.

SUMMARY OF THE INVENTION

This invention has been devised to offer mono-lens eyeglasses, which has a frame provided with a notch respectively in two opposite ends and a long groove formed in a lower edge for an upper edge of a mono-lens to fit therein. Then the front end of each temple is pivotally connected in the notch, and an oval tip of of each front end engages in an oval notch respectively formed in two ends of the mono-lens. The front end of each temple is swingable with a screw as a pivots engaging with the notch or disengage from the notch by swinging the temple for replacing the mono-lens with a new one without any tools such as drivers.

BRIEF DESCRIPTION OF DRAWINGS

This invention will be better understood by referring to the accompanying drawings, wherein:

FIG. 2 is a side partial view of the mono-lens eyeglasses of the present invention;

FIG. 3 is side view of the mono-lens disengaged from the front end of the temple of the present invention;

DETAILED DESCRIPTION OF THE PREFERRED EMBODIMENT

Figure 1:
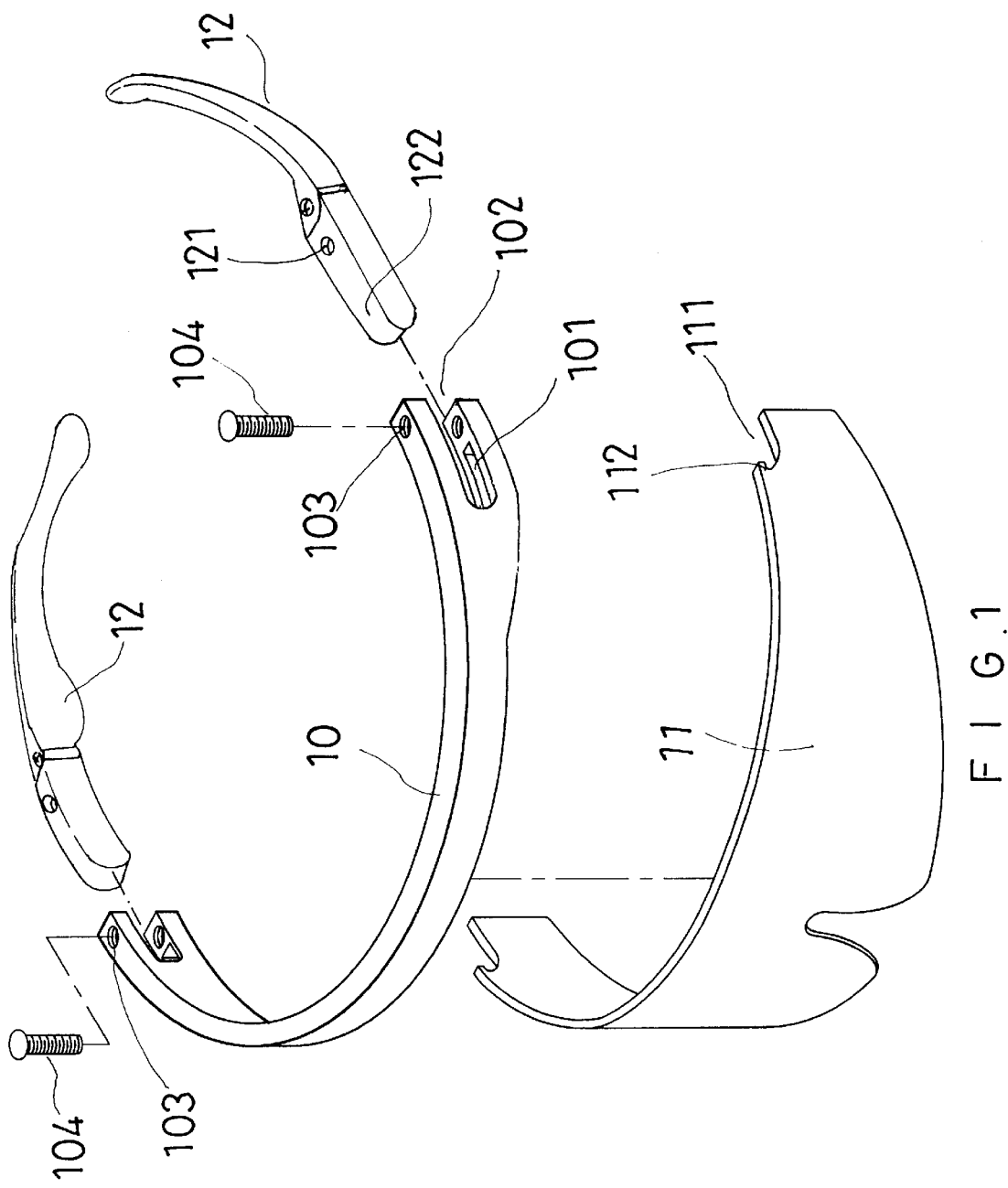
FIG. 1 is an exploded perspective view of a mono-lens eyeglasses of the present invention.
Figure 4:
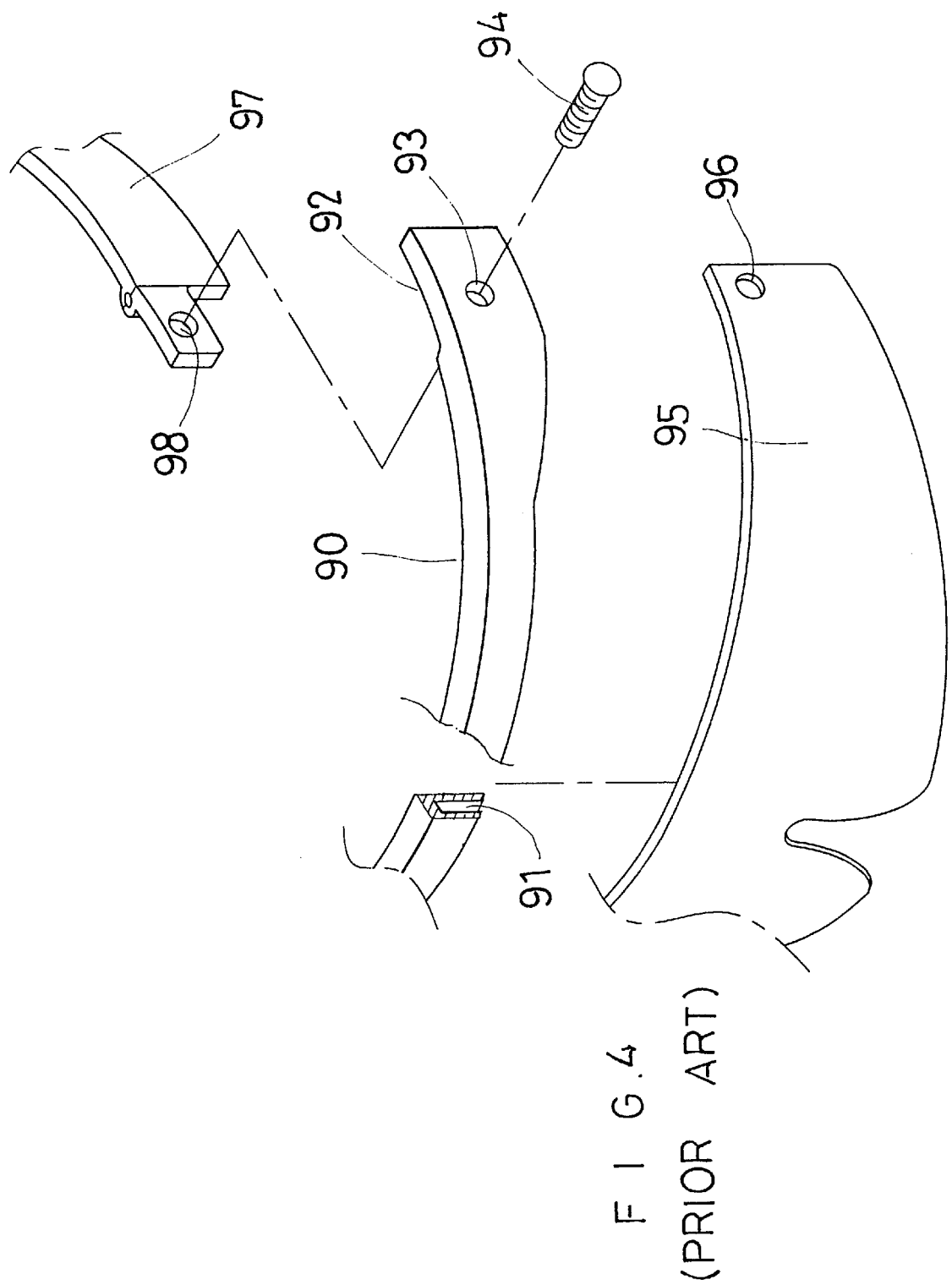
FIG. 4 an exploded perspective view of first known conventional mono-lens eyeglasses; and, FIG. 5 is a perspective view of second known conventional mono-lens eyeglasses.
Figure 5:
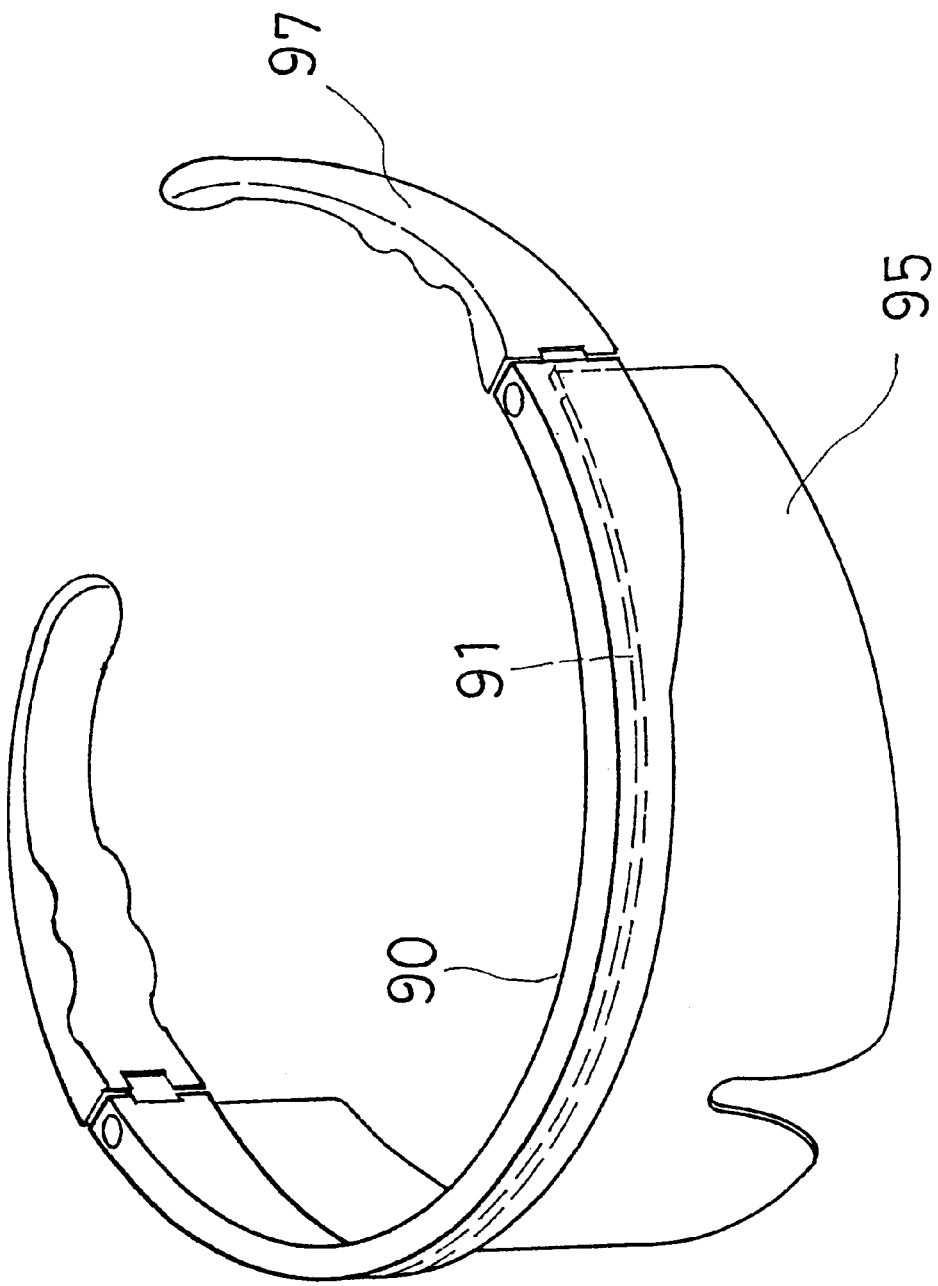

A preferred embodiment of mono-lens eyeglasses in the present invention, as shown in FIG. 1, includes a frame 10, a mono-lens 11 and two temples 12 combined together.

The frame 10 is lengthwise curved, having a long groove 101 formed in a lengthwise lower edge, a center opening 102 respectively formed in two opposite ends, and a position hole 103 respectively formed laterally in the two ends for a screw 104 to engage in for securing each temple 12 with the frame 10.

The mono-lens 11 is formed integral, having the same curvature as the frame 10, a notch 111 respectively formed in two opposite ends, and a curved outward edge 112 formed the notch 111.

Each temple 12 has a vertical hole 121 in a front portion, and an engage member 122 of a proper shape formed in a front end.

In assembling the eyeglasses, firstly, the mono-lens 11 is fitted in the long groove 101 of the frame 10, with the notches 111 located in the center openings 102 of the frame 10. Then the engage member 122 of each temple 12 is fitted in the center opening 102, with the vertical hole 121 aligned to the hole 103 of the frame 10. Next, the screw 104 is screwed to engage the holes 103 and 121 so that each temple 12 is combined with the frame 10 and may swing with the screw 104 as a pivot.

In using the eyeglasses, referring to FIGS. 2 and 3, the engage member 122 of each temple 12 is swung to force the engage member 122 move to engage the notch 111 and kept in the position by the curved outward edge 112 so as to keep the mono-lens 11 in its position without falling off the frame 10.

Provided the mono-lens 11 is wanted to be replaced with another mono-lens 11, the engage member 122 of each temple 12 is manually swung to separate from the notch 111 and the curved outward edge 112 and out of the center opening 102 of the frame 10, permitting the engage member 122 freed so that the mono-lens 11 may be removed from the long groove 101 and a new mono-lens may be fitted in the groove 101 to take place the one removed.

As understood from the above description, changing the mono-lens can be effected by pushing and swinging the two engage members 122 of the temples 12 relative to the frame 10 for a certain angle, with the mono-lens 11 freed from the engage members 122 and able to be replaced with another one without needing any tools for replacement.

While the preferred embodiment of the invention has been described above, it will be recognized and understood that various modifications may be made therein and the appended claims are intended to cover all such modifications which may fall within the spirit and scope of the invention.

What is claimed is:

1. A mono-lens eyeglasses comprising a frame, a mono-lens and two temples combined together; and
    characterized by said frame having a center opening formed respectively in two opposite ends for a front end of each said temple to fit therein and a long groove formed in a lower lengthwise edge, said mono-lens provided with a notch respectively at two opposite ends, said notch located at an inner end of each said center opening of said frame when an upper edge of said mono-lens is fitted in said long groove of said frame, said front end of each said temple able to engage in or disengage from said notch of said mono-lens by swinging so that said mono-lens may be removed from said frame and replaced with a new one.

2. The mono-lens eyeglasses as claimed in claim 1, wherein each said notch of said mono-lens is formed with a curved outward edge.

* * * * *